(12) United States Patent
Namgoong et al.

(10) Patent No.: US 7,524,662 B2
(45) Date of Patent: Apr. 28, 2009

(54) METHOD OF STORING SUBSTRATE HAVING ACTIVE GROUP OR PROBE MOLECULE IMMOBILIZED THEREON USING UV FILM, METHOD OF PRODUCING MICROARRAY USING THE UV FILM, AND SUBSTRATE HAVING THE UV FILM ATTACHED THERETO

(75) Inventors: Ji-na Namgoong, Gyeonggi-do (KR); Kyu-youn Hwang, Incheon-si (KR); Jeo-young Shim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 346 days.

(21) Appl. No.: 11/207,343

(22) Filed: Aug. 19, 2005

(65) Prior Publication Data
US 2006/0040369 A1 Feb. 23, 2006

(30) Foreign Application Priority Data
Aug. 20, 2004 (KR) ...................... 10-2004-0065882

(51) Int. Cl.
*C12N 11/16* (2006.01)
*C12Q 1/68* (2006.01)
(52) U.S. Cl. .......................................... 435/174; 435/6

(58) Field of Classification Search ................. 435/174, 435/6
See application file for complete search history.

(56) References Cited

U.S. PATENT DOCUMENTS

| 4,720,317 | A | 1/1988 | Kuroda et al. ................ 156/250 |
| 4,913,960 | A | 4/1990 | Kuroda et al. ................ 428/345 |
| 4,968,559 | A | 11/1990 | Kuroda et al. ................ 428/354 |
| 5,143,854 | A | 9/1992 | Pirrung et al. .............. 436/518 |
| 5,424,186 | A | 6/1995 | Fodor et al. ..................... 435/6 |
| 5,445,934 | A | 8/1995 | Fodor et al. ..................... 435/6 |
| 5,744,305 | A | 4/1998 | Fodor et al. ..................... 435/6 |
| 2003/0224506 | A1* | 12/2003 | Agrawal et al. ........... 435/287.2 |

* cited by examiner

*Primary Examiner*—Chih-Min Kam
(74) *Attorney, Agent, or Firm*—Cantor Colburn LLP

(57) ABSTRACT

Provided is a method of storing a substrate having an active group or a probe molecule immobilized thereon. The method includes attaching a UV film to a surface of the substrate having the active group or probe immobilized thereon; and exposing the UV film to UV light, wherein the UV film comprises a UV-permeable base film and a pressure sensitive adhesive layer formed on a surface of the UV-permeable base film to immobilize the substrate, and when the pressure sensitive adhesive layer is exposed to the UV light, its adhesive force decreases.

7 Claims, 3 Drawing Sheets

METHOD OF STORING SUBSTRATE HAVING ACTIVE GROUP OR PROBE MOLECULE IMMOBILIZED THEREON USING UV FILM, METHOD OF PRODUCING MICROARRAY USING THE UV FILM, AND SUBSTRATE HAVING THE UV FILM ATTACHED THERETO

CROSS-REFERENCE TO RELATED PATENT APPLICATION

This application claims the benefit of Korean Patent Application No. 10-2004-0065882, filed on Aug. 20, 2004, in the Korean Intellectual Property Office, the disclosure of which is incorporated herein in its entirety by reference.

BACKGROUND OF THE INVENTION

1. Field of the Invention

The present invention relates to a method of storing a substrate having an active group or a probe molecule immobilized thereon, a method of producing a microarray using the UV film, and a substrate having the UV film attached thereto.

2. Description of the Related Art

A microarray is a substrate on which specific molecules are immobilized in predetermined regions at a high density. Examples of microarrays include a polynucleotide microarray and a protein microarray. A polynucleotide microarray is a substrate on which polynucleotides are immobilized in predetermined regions at a high density. Such microarrays are well known in the art and are disclosed in, for example, U.S. Pat. Nos. 5,445,934 and 5,744,305.

Generally, microarrays are produced using photolithographic technology. In the photolithographic method, a predetermined region of a substrate coated with a monomer having a removable protective group is exposed to an energy source to remove the protective group from the monomer, and then a second monomer having a removable protective group is coupled to the monomer. The process of exposure to an energy source, removal of the protective group, and coupling of a monomer is repeated to produce a desired polynucleotide array. The polynucleotide immobilized on the microarray is synthesized by extending the monomers one by one. In a spotting method, a microarray is produced by immobilizing a previously synthesized polynucleotide at a predetermined location on a substrate. The substrate is initially coated with an active group, for example, an amino group or an aldehyde group, and the probe molecule such as a polynucleotide is immobilized on the substrate via the active group. Polynucleotide microarrays and methods of producing the same are described in U.S. Pat. Nos. 5,744,305, 5,143,854 and 5,424,186, the disclosures of which are incorporated herein in their entireties by reference.

In general, when a microarray is produced using the spotting method, the substrate coated with the active group is previously manufactured, and is stored or in the market until use. The active group coated on the substrate may react with oxygen in the atmosphere to change its reactivity or be adversely affected by moisture in the atmosphere. Thus, the substrate coated with the active group is packaged in a nitrogen-filled package, in a vacuum package, or packaged together with a desiccating agent. However, such a packaging method cannot fully protect the substrate against oxygen or moisture in the atmosphere and is complicated.

A UV film is used during the manufacture of a semiconductor chip in order to protect a surface of the semiconductor chip from silicon particles generated in a process of dicing the semiconductor chip into semiconductor chip units or from water used in the dicing process. That is, in order to protect the surface of the semiconductor chip, the UV film is attached to a semiconductor wafer, the dicing process is performed, and then the UV film is removed from the wafer. The UV film is sufficiently adhesive force to be attached to the silicon wafer at the initial time of the dicing, but the adhesiveness remarkably decreases after the UV film is exposed to UV light. The UV film is widely used when dicing objects such as semiconductor wafers, and is well known in the art. For example, dicing films described in U.S. Pat. Nos. 4,720,317, 4,913,960, and 4,968,559, the disclosures of which are incorporated herein in their entirety by reference, can be used.

The inventors of the present invention conducted research on a method of safely storing a substrate coated with an active group for a long time and discovered that when the substrate coated with the active group is stored with a UV film attached thereto, the lifetime of the substrate can be extended.

SUMMARY OF THE INVENTION

The present invention provides a method of storing a substrate having an active group or a probe molecule immobilized thereon for a long time using a UV film.

The present invention also provides a method of efficiently producing a microarray using the UV film.

The present invention also provides a substrate having an active group or a probe molecule immobilized thereon and the UV film attached thereto.

According to an aspect of the present invention, there is provided a method of storing a substrate having an active group or a probe molecule immobilized thereon, comprising: attaching a UV film to a surface of the substrate having the active group or probe immobilized thereon; and exposing the UV film to UV light, wherein the UV film comprises a UV-permeable base film and a pressure sensitive adhesive layer formed on a surface of the UV-permeable base film to immobilize the substrate, and when the pressure sensitive adhesive layer is exposed to the UV light, its adhesive force decreases.

According to another aspect of the present invention, there is provided a method of producing a microarray, comprising: attaching a UV film to a surface of a substrate having a probe molecule immobilized thereon; exposing the UV film to UV light; and dicing the resultant product to obtain a unit microarray, wherein the UV film comprises a UV-permeable base film and a pressure sensitive adhesive layer formed on a surface of the UV-permeable base film to immobilize the substrate, and when the pressure sensitive adhesive layer is exposed to the UV light, its adhesive force decreases.

According to still another aspect of the present invention, there is provided a substrate having a UV film attached thereto, the substrate produced using a method comprising: attaching the UV film to a surface of a substrate having an active group or a probe molecule immobilized thereon; and exposing the UV film to UV light, wherein the UV film comprises a UV-permeable base film and a pressure sensitive adhesive layer formed on a surface of the UV-permeable base film to immobilize the substrate, and when the pressure sensitive adhesive layer is exposed to the UV light, its adhesive force decreases.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
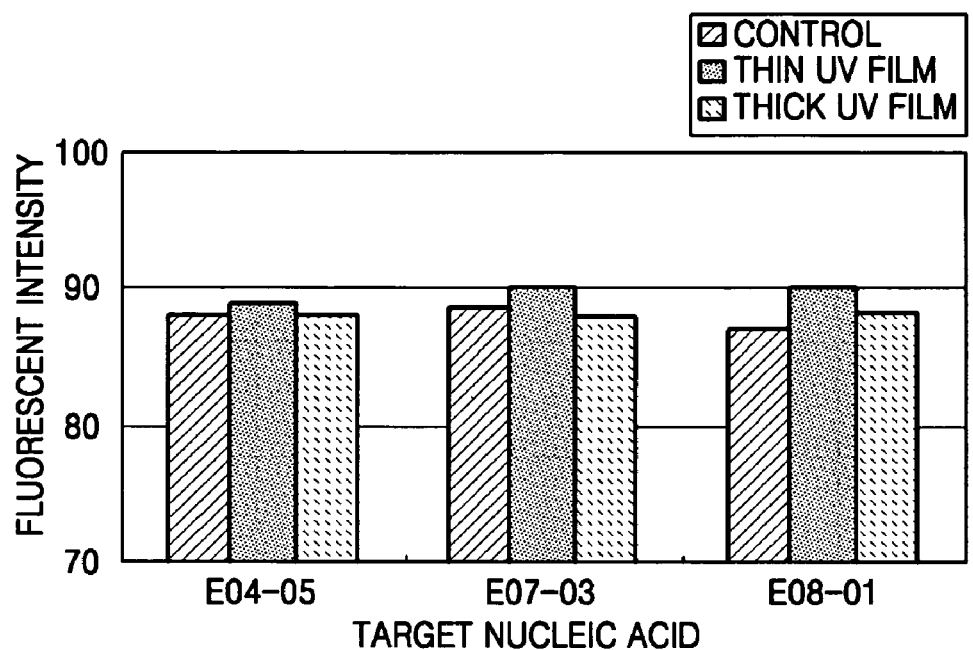
FIG. 1 is a graph illustrating fluorescent intensities of background regions for a control, a DNA microarray using the thick UV film, and a DNA microarray using the thin UV film measured right after the production of the microarray.

According to an embodiment of the present invention, there is provided a method of storing a substrate having an active group or a probe molecule immobilized thereon, comprising: attaching a UV film to a surface of the substrate having the active group or probe immobilized thereon; and exposing the UV film to UV light, wherein the UV film comprises a UV-permeable base film and a pressure sensitive adhesive layer formed on a surface of the UV-permeable base film to immobilize the substrate, and when the pressure sensitive adhesive layer is exposed to the UV light, its adhesive force decreases.

Throughout this specification, the term "UV film" refers to a film comprising a UV-permeable base film and a pressure sensitive adhesive layer formed on a surface of the UV-permeable base film to immobilize the substrate, and when the pressure sensitive adhesive layer is exposed to the UV light, its adhesive force decreases. The UV film is widely used in dicing methods including dicing a semiconductor wafer and well known in the art. For example, dicing films described in U.S. Pat. Nos. 4,720,317, 4,913,960, and 4,968,559, the disclosures of which are incorporated herein in their entirety by reference, can be used. The UV film has an initial adhesive force, for example, of about 100-1000 g/mm, thus ensuring that the substrate can be precisely diced. After the UV film is diced and exposed to UV light, the adhesive force of the UV film decreases to several g/25 mm such that the UV film can be easily removed from the dice.

In an embodiment of the present invention, the pressure sensitive adhesive layer may comprise at least one elastomer selected from the group consisting of a polymer comprising acrylic acid ester copolymer, and a saturated copolyester comprising dibasic carboxylic acid and dihydroxy alcohol;

15-200 parts by weight of UV-polymerizable acrylic acid ester having at least two acryloyl or methacryloyl groups in its molecule and a molecular weight of 1000 or less, based on 100 parts by weight of the elastomer;

10-200 parts by weight of a tackifier based on 100 parts by weight of the elastomer;

1-100 parts by weight of anhydrous silica powders based on 100 parts by weight of the elastomer; and a photopolymerization initiator in an amount sufficient to induce photopolymerization of the UV-polymerizable acrylic acid ester.

The pressure sensitive adhesive material may comprise 1-100 parts by weight of polyisocyanate based on 100 parts by weight of the elastomer.

The UV-permeable base film may comprise a plasticizing agent, be permeable to UV light and have a barrier layer consisting of UV-polymerizable acrylic acid ester and a resin that is not permeable to the plasticizing agent between the UV-permeable base film and the pressure sensitive adhesive layer. The UV-permeable base film may be composed of polyvinyl chloride, but the material composing the UV-permeable base film is not limited thereto.

The barrier layer may be composed of a resin selected from the group consisting of polyethylene, polypropylene, polymethacrylate, and polyethylene terephthalate. Alternatively, the barrier layer may be composed of a modified acrylic resin selected from the group consisting of modified alkylated acrylic resin and thermosetting acrylic resin.

The UV film may be UE111AJ (available from Nitto Co., Ltd.) or T5782 (available from Lintec Co., Ltd.). In the product UE111AJ, a base film is composed of PVC and has a thickness of 97 μm and an adhesive layer has a thickness of 10 μm. The adhesive force is 8.33 N/20 mm before exposure to UV light and 0.22 N/20 mm after the exposure to the UV light. In the product T5782, a base film is composed of polyolefin and has a thickness of 35 μm and an adhesive layer (a class of acryl) has a thickness of 20 μm. The adhesive force is 2.4 N/25 mm before exposure to UV light and 0.1 N/25 mm after the exposure to the UV light.

In an embodiment of the present invention, the active group refers to a group that immobilizes a probe molecule. For example, the active group may be selected from the group consisting of an amino group, an aldehyde group, and an ester group. The probe molecule refers to a molecule which can specifically bind to a target molecule. The probe molecule may be selected from the group consisting of a nucleic acid, a protein, and a polysaccharide. In an embodiment of the present invention, when the probe is immobilized on a predetermined region of the substrate at a high density, the substrate may form a microarray. Thus, a method of storing a microarray is also provided.

According to another embodiment of the present invention, there is provided a method of producing a microarray, comprising: attaching a UV film to a surface of a substrate having a probe molecule immobilized thereon in predetermined regions; exposing the UV film to UV light; and dicing the resultant product to obtain a unit microarray, wherein the UV film comprises a UV-permeable base film and a pressure sensitive adhesive layer formed on a surface of the UV-permeable base film to immobilize the substrate, and when the pressure sensitive adhesive layer is exposed to the UV light, its adhesive force decreases.

In the present embodiment, the pressure sensitive adhesive layer, the UV-permeable base film, the barrier layer, and the probe molecule are the same as described above for the method of storing the substrate having the active group or probe molecule immobilized thereon.

According to still another embodiment of the present invention, there is provided a substrate having a UV film attached thereto, the substrate produced using a method comprising: attaching the UV film to a surface of a substrate having an active group or a probe molecule immobilized thereon; and exposing the UV film to UV light, wherein the UV film comprises a UV-permeable base film and a pressure sensitive adhesive layer formed on a surface of the UV-permeable base film to immobilize the substrate, and when the pressure sensitive adhesive layer is exposed to the UV light, its adhesive force decreases.

In the present embodiment, the pressure sensitive adhesive layer, the UV-permeable base film, the barrier layer, and the probe molecule are the same as described above for the method of storing the substrate having the active group or probe molecule immobilized thereon.

Hereinafter, the present invention will be described in more detail with reference to the following examples. However, these examples are provided for the purpose of illustration and are not intended to limit the scope of the invention.

EXAMPLES

Example 1

Storage of Substrate Coated with Amino Group

A UV film was attached to a substrate coated with an amino group and the substrate was exposed to UV light. After storing the exposed substrate for predetermined periods, the UV film was removed from the substrate and the substrate was exposed to fluorescent light. Then, light spontaneously emitted from the substrate was measured to examine the state of the amino group.

In detail, first, a solution of γ-aminopropyltriethoxy silane (GAPS) in ethanol (a concentration of 20% (v/v)) was spin coated on a silicon substrate using spin coater model CEE 70 (available from CEE). The spin coating process comprised an initial coating at 500 rpm for 10 seconds and a main coating at 2,000 rpm for 10 seconds. After the completion of the spin coating, the substrate was fixed on a Teflon wafer carrier to be cured at 120° C. for 40 minutes. Then, the substrate was dipped in water for 10 minutes, sonicated for 15 minutes for washing, and again dipped in water for 10 minutes. Next, the substrate was spin-dried.

Then, one of two types of UV film, i.e., a thin UV film, T5782 (available from Lintec Co., Ltd.) (total thickness of 55 μm) and a thick film, UE111AJ (available from Nitto Co., Ltd.) (total thickness of 107 μm), was attached to the formed GAPS layer. The resultant structure was exposed to UV light having a wavelength of 345 nm and left at room temperature. Thereafter, the UV film was removed from the substrate and fluorescence intensity was measured at 543 nm using a Genepix4000B instrument (available from Axon Instruments). The results are shown in Table 1.

TABLE 1

| Storage time (day) | Control (Standard deviation) | Thick UV film (Standard deviation) |
|---|---|---|
| 0 | 62.3 (2.5) | 62.3 (2.5) |
| 5 | 143 (14.3) | 65 (0.6) |
| 11 | 200 (32.1) | 70 (2.7) |
| 21 | 211 (17.5) | 68 (5.8) |

As shown in Table 1, when the substrate was stored after being coated with the thick UV film, the spontaneous fluorescent intensity changed little over the storage period. Meanwhile, when the substrate was stored without being coated with the thick UV film, the spontaneous fluorescent intensity was greatly increased.

Example 2

Storage and Hybridization of DNA Microarray

A mixture of PEG and a DNA functionalized with an amino group at its 5' end was spotted on a glass substrate coated with GAPS to produce a DNA microarray having DNAs arranged in spots.

In detail, first, the glass substrate coated with GAPS was purchased from Corning (Cat no. 40004). Probe oligonucleotides functionalized with an aminohexyl group at their 5' ends were respectively dissolved at a concentration of 20 μM in a solution of 6 mM PEG (available from Aldrich, Mw 10,000) in 0.1 M NaHCO$_3$ (pH 9) containing 50% DMSO and immobilized on the substrate. The immobilized probe oligopolynucleotides are shown in the following sequence listing and include perfect match sequences (wild-type probes, WP) (SEQ ID Nos. 1, 3, and 5) that are complementary to a specific region of exons 4, 7, and 8 in a gene of maturity-onset diabetes of the young, MODY 1, and mismatch sequences (mutant-type probes, MP) (SEQ ID No. 2, 4, and 6) that are complementary to all but one nucleotide of to a specific region of exons 4, 7, and 8 in a gene of maturity-onset diabetes of the young, MODY 1, and differs on nucleotide from the sequence of wild-type probes.

A UV film was attached to the produced DNA microarray and the microarray was exposed to UV light and stored for predetermined periods. Then, the UV film was removed from the substrate and target DNAs, E04-05 (SEQ ID No. 7), E07-03 (SEQ ID No. 8), and E08-01 (SEQ ID No. 9) were added to the substrate to perform a hybridization reaction at 37° C. for 16 hours. To estimate the results of the hybridization reaction, fluorescent intensity was measured in the same manner as in Example 1, for both the spot region on which the WP was immobilized and the background region.

The results are illustrated in FIGS. 1 through 4.

FIG. 1 is a graph illustrating fluorescent intensities of background regions for a control, a DNA microarray using the thick UV film, and a DNA microarray using the thin UV film, measured right after the production of the microarray. For the control, the fluorescent intensity was measured right after the production of the DNA microarray. For the microarrays using the thick film and the thin film, respectively, the fluorescent intensities were measured immediately after exposing the microarrays having the films attached thereto to the UV light and removing the films therefrom.

Figure 2:
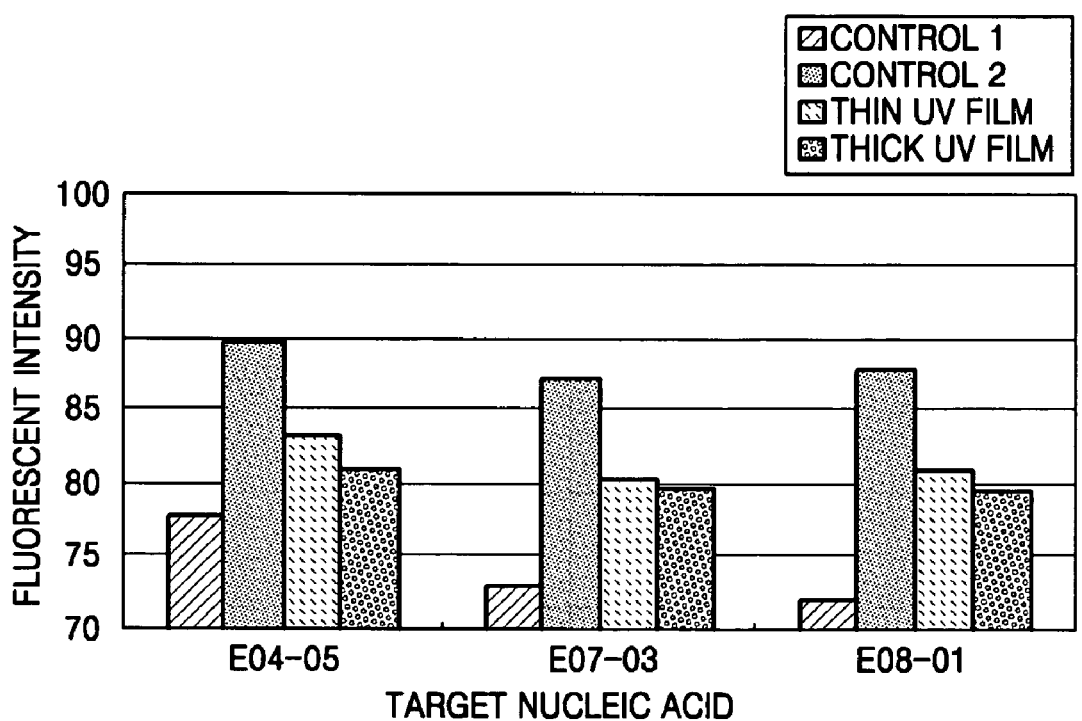
FIG. 2 is a graph illustrating fluorescent intensities of background regions for a first control measured immediately after manufacturing, and a second control, a DNA microarray using the thick UV film, and a DNA microarray using the thin UV film, measured 4 weeks after the production of the microarray.

FIG. 2 is a graph illustrating fluorescent intensities of background regions for a first control measured immediately after manufacturing (control 1), and a second control (control 2), a DNA microarray using the thick UV film, and a DNA microarray using the thin UV film measured 4 weeks after the production of the microarray. For the first control, the fluorescent intensity was measured right after the production of the DNA microarray. For the second control, the fluorescent intensity was measured after storing the DNA microarray without a film thereon for 4 weeks. For the microarrays using the thick film and the thin film, respectively, the fluorescent intensities were measured after exposing the microarrays having the films attached thereto to the UV light, storing the microarrays for 4 weeks, and removing the films therefrom.

Referring to FIG. 1, right after the production of the DNA microarrays, there was little difference between the fluorescent intensities of the backgrounds of the control and the test groups using the films. However, referring to FIG. 2, after the storage for 4 weeks, the microarrays stored with the films attached thereto had lower fluorescent intensities of the backgrounds than the microarray stored without the film. This revealed that the microarrays stored with the films were well stored without being denatured.

Figure 3:
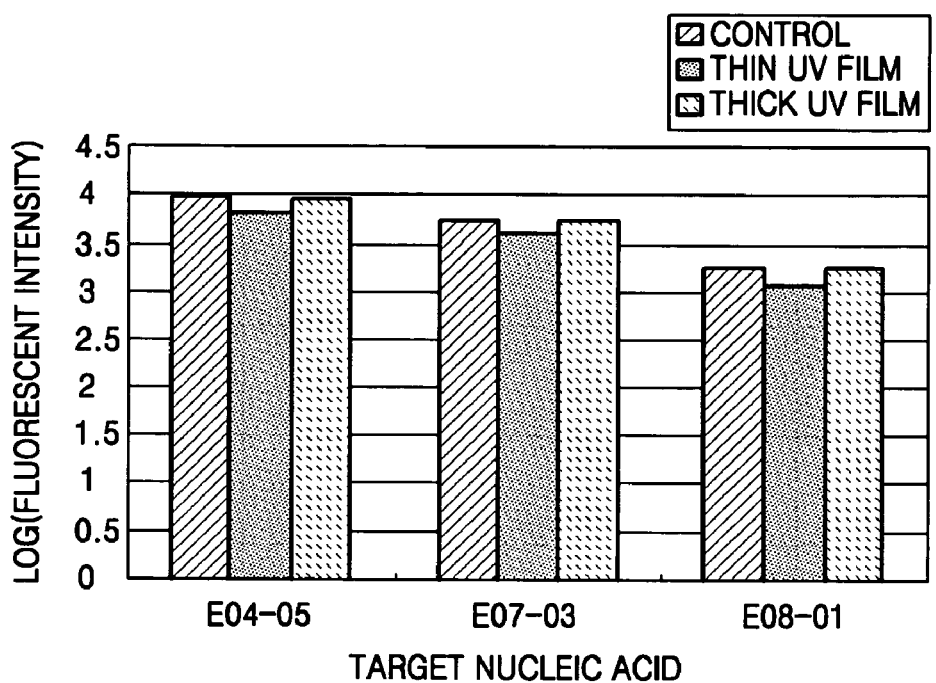
FIG. 3 is a graph illustrating fluorescent intensities of spot regions for a control, a DNA microarray using the thick UV film, and a DNA microarray using the thin UV film, measured right after their production.

FIG. 3 is a graph illustrating fluorescent intensities of spot regions of a control, a DNA microarray using the thick UV film, and a DNA microarray using the thin UV film measured right after their production. For the control, the fluorescent intensity was measured right after the production of the DNA microarray. For the microarrays using the thick film and the thin film, respectively, the fluorescent intensities were measured after exposing the microarrays having the films attached thereto to the UV light and removing the films therefrom.

Figure 4:
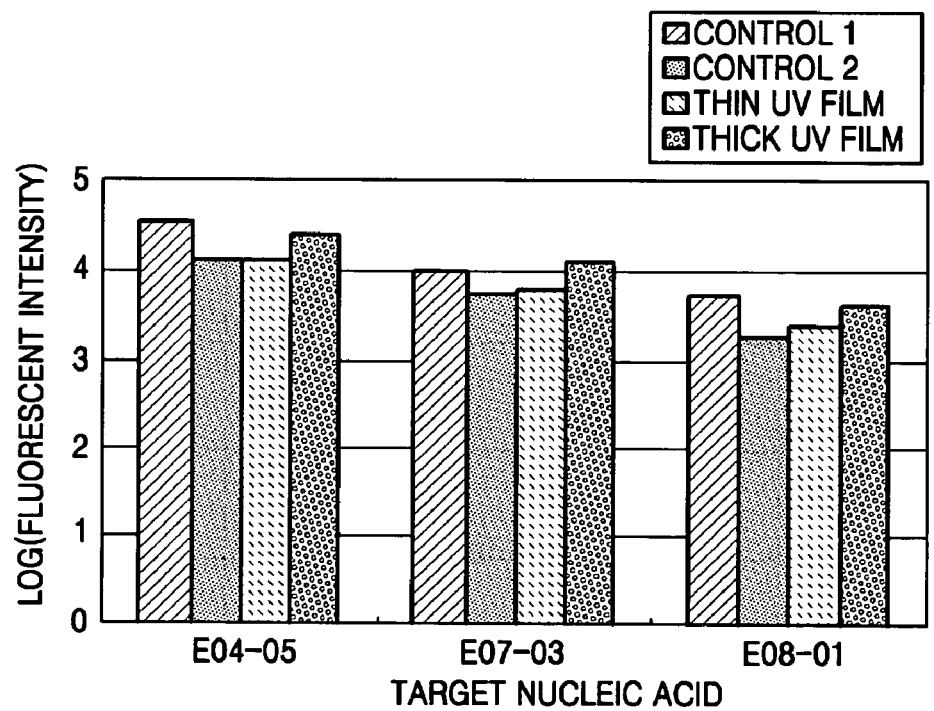
FIG. 4 is a graph illustrating fluorescent intensities of spot regions for a first control measured immediately after manufacturing, and a second control, a DNA microarray using the thick UV film, and a DNA microarray using the thin UV film measured 4 weeks after their production.

FIG. 4 is a graph illustrating fluorescent intensities of spot regions for a first control measured immediately after manufacturing (control 1), and a second control (control 2), a DNA microarray using the thick UV film, and a DNA microarray using the thin UV film measured 4 weeks after their production. For the first control, the fluorescent intensity was measured right after the production of the DNA microarray. For the second control, the fluorescent intensity was measured after storing the DNA microarray without a film thereon for 4 weeks. For the microarrays using the thick film and the thin film, respectively, the fluorescent intensities were measured after exposing the microarrays having the films attached thereto to the UV light, storing the microarrays for 4 weeks, and removing the films therefrom.

Referring to FIG. 3, right after the production of the DNA microarrays, the spot regions of the microarrays using the thick film and the thin film, respectively, had similar fluorescent intensities to that of the control. This revealed that degrees of immobilization of the probe molecules were not affected by the adhesives of the UV films. Referring to FIG. 4, after the storage for 4 weeks, all the spot regions of the second control had lower fluorescent intensities than the spot regions of the first control, and all the spot regions of the microarrays stored with the films attached thereto had higher fluorescent intensities than the spot regions of the second control. In particular, all the spot regions of the microarray stored with the thick UV film had significantly higher fluorescent intensities than the spot regions of the second control.

A log ratio, i.e., log (fluorescent intensity of perfect match)/(fluorescent intensity of mismatch) was calculated based on the fluorescent intensities measured as above.

Figure 5:
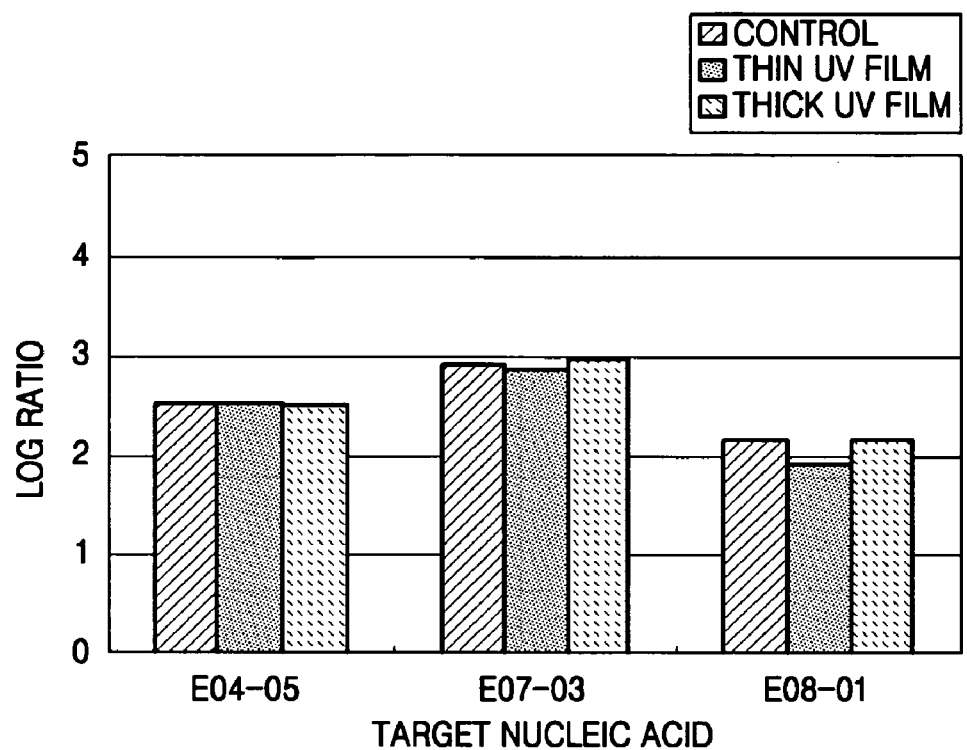
FIG. 5 is a graph illustrating a log ratio of fluorescent intensities of spot regions of a control, a DNA microarray using the thick UV film, and a DNA microarray using the thin UV film, measured right after their production.

FIG. 5 is a graph illustrating a log ratio of fluorescent intensities of spot regions of a control, a DNA microarray using the thick UV film, and a DNA microarray using the thin UV film, measured right after their production. For the control, the fluorescent intensity was measured right after the production of the DNA microarray. For the microarrays using the thick film and the thin film, respectively, the fluorescent intensities were measured immediately after exposing the microarrays having the films attached thereto to the UV light and removing the films therefrom.

Figure 6:
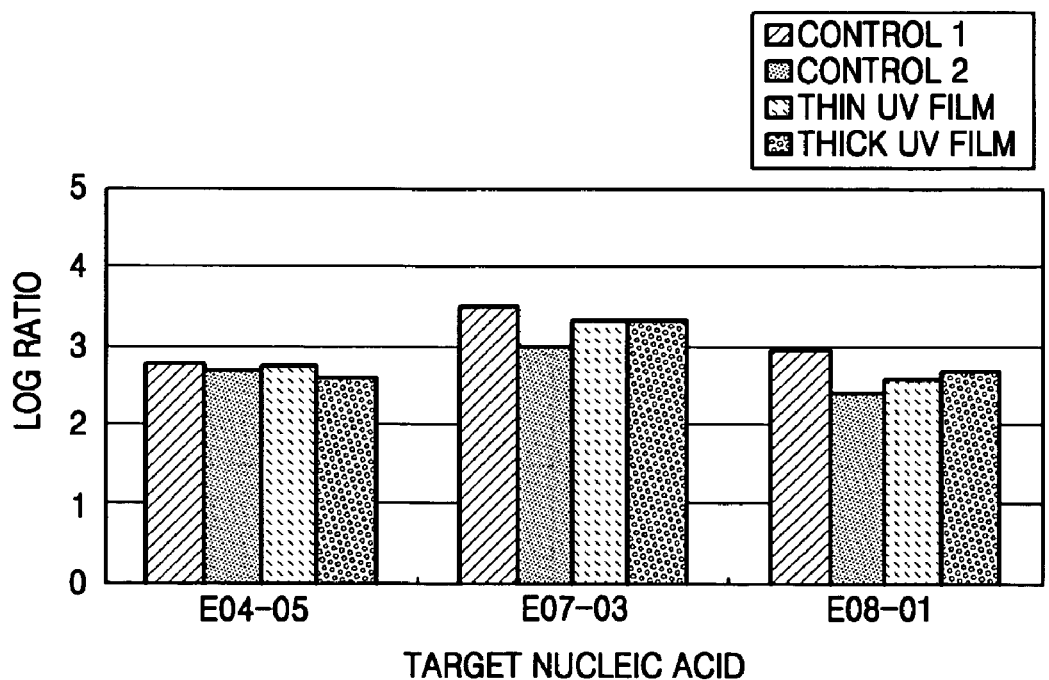
FIG. 6 is a graph illustrating a log ratio of fluorescent intensities of spot regions for a first control measured immediately after manufacturing, and a second control, a DNA microarray using the thick UV film, and a DNA microarray using the thin UV film measured 4 weeks after their production.

FIG. 6 is a graph illustrating a log ratio of fluorescent intensities of spot regions for a first control measured immediately after manufacturing (control 1), and a second control (control 2), a DNA microarray using the thick UV film, and a DNA microarray using the thin UV film measured 4 weeks after their production. For the first control, the fluorescent intensity was measured right after the production of the DNA microarray. For the second control, the fluorescent intensity was measured after storing the DNA microarray without a film thereon for 4 weeks. For the microarrays using the thick film and the thin film, respectively, the fluorescent intensities were measured after exposing the microarrays having the films attached thereto to the UV light, storing the microarrays for 4 weeks, and removing the films therefrom.

Referring to FIG. 5, right after the production of the DNA microarrays, there was no great difference between the log ratios of the control and the microarrays having the thick film and the thin film, respectively. Referring to FIG. 6, the microarrays stored with the thick film and the thin film, respectively, had significantly higher log ratios than the second control and similar log ratios to the first control, as estimated using a t-test.

By using the method of storing a substrate coated with an active group or a probe according to the present invention, the substrate may be protected against factors which make the active group or probe unstable, such as oxygen, in an easy and simple manner By using the method of producing a microarray according to the present invention, the active group or the probe is not damaged during the storage of the substrate and thus, a high quality microarray may be produced.

According to the present invention, a substrate having an active group immobilized thereon or a microarray may be stored for a long time by attaching a UV film thereto.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of storing a substrate having an active group or a probe molecule immobilized thereon, comprising:
   attaching a UV film to a surface of a substrate having an active group or a probe molecule immobilized thereon;
   exposing the UV film to UV light; and
   storing the substrate for a predetermined period,
   wherein the UV film comprises a UV-permeable base film and a pressure sensitive adhesive layer formed on a surface of the UV-permeable base film to immobilize the substrate, and when the pressure sensitive adhesive layer is exposed to the UV light, its adhesive force decreases,
   wherein the active group is selected from the group consisting of an amino group, an aldehyde group, and an ester group and the probe molecule is selected from the group consisting of a nucleic acid, a protein, and a polysaccharide.

2. The method of claim 1, wherein the pressure sensitive adhesive layer comprises
   at least one elastomer selected from the group consisting of a polymer comprising acrylic acid ester copolymer, and a saturated copolyester comprising dibasic carboxylic acid and dihydroxy alcohol;
   15-200 parts by weight of UV-polymerizable acrylic acid ester having at least two acryloyl or methacryloyl groups and a molecular weight of 1000 or less, based on 100 parts by weight of the elastomer;
   10-200 parts by weight of a tackifier based on 100 parts by weight of the elastomer;
   1-100 parts by weight of anhydrous silica powders based on 100 parts by weight of the elastomer; and
   a photopolymerization initiator in an amount sufficient to induce photopolymerization of the UV-polymerizable acrylic acid ester.

3. The method of claim 1, wherein the UV-permeable base film comprises polyvinyl carbonate having a thickness of 97 μm and the pressure sensitive adhesive layer has a thickness of 10 μm, or
   the UV-permeable base film comprises polyolefin having a thickness of 35 μm and the pressure sensitive adhesive layer has a thickness of 20 μm.

4. A method of producing a microarray, comprising:

attaching a UV film to a surface of a substrate having a probe molecule immobilized thereon in predetermined regions, wherein the probe molecule is selected from the group consisting of a nucleic acid, a protein, and a polysaccharide;

exposing the UV film to UV light; and dicing the substrate with the attached UV film to obtain a unit microarray, wherein the UV film comprises a UV-permeable base film and a pressure sensitive adhesive layer formed on a surface of the UV-permeable base film to immobilize the substrate, and when the pressure sensitive adhesive layer is exposed to the UV light, its adhesive force decreases.

5. The method of claim 4, wherein the pressure sensitive adhesive layer comprises at least one elastomer selected from the group consisting of a polymer comprising acrylic acid ester copolymer, and a saturated copolyester comprising dibasic carboxylic acid and dihydroxy alcohol;

15-200 parts by weight of UV-polymerizable acrylic acid ester having at least two acryloyl or methacryloyl groups and a molecular weight of 1000 or less, based on 100 parts by weight of the elastomer;

10-200 parts by weight of a tackifier based on 100 parts by weight of the elastomer;

1-100 parts by weight of anhydrous silica powders based on 100 parts by weight of the elastomer; and a photopolymerization initiator in an amount sufficient to induce photopolymerization of the UV-polymerizable acrylic acid ester.

6. The method of claim 4, wherein the UV-permeable base film comprises polyvinyl carbonate having a thickness of 97 μm and the pressure sensitive adhesive layer has a thickness of 10 μm, or the UV-permeable base film comprises polyolefin having a thickness of 35 μm and the pressure sensitive adhesive layer has a thickness of 20 μm.

7. A substrate having a UV film attached thereto, the substrate produced using a method comprising:

attaching a UV film to a surface of a substrate having an active group or a probe molecule immobilized thereon; and exposing the UV film to UV light, wherein the UV film comprises a UV-permeable base film and a pressure sensitive adhesive layer formed on a surface of the UV-permeable base film to immobilize the substrate, and when the pressure sensitive adhesive layer is exposed to the UV light, its adhesive force decreases, and wherein the UV film is not detached from the substrate by the exposing to UV light, wherein the active group is selected from the group consisting of an amino group, an aldehyde group, and an ester group and the probe molecule is selected from the group consisting of a nucleic acid, a protein, and a polysaccharide.

* * * * *

SEQUENCE LISTING

<160> NUMBER OF SEQ ID NOS: 9

<210> SEQ ID NO 1
<211> LENGTH: 17
<212> TYPE: DNA
<213> ORGANISM: Artificial Sequence
<220> FEATURE:
<223> OTHER INFORMATION: wild type probe for E04-05

<400> SEQUENCE: 1
gaccttcgag tgctgat                                                    17

```
<210> SEQ ID NO 2
<211> LENGTH: 17
<212> TYPE: DNA
<213> ORGANISM: Artificial Sequence
<220> FEATURE:
<223> OTHER INFORMATION: mutant type probe for E04-05

<400> SEQUENCE: 2
gaccttcgaa tgctgat                                                     17

<210> SEQ ID NO 3
<211> LENGTH: 17
<212> TYPE: DNA
<213> ORGANISM: Artificial Sequence
<220> FEATURE:
<223> OTHER INFORMATION: wild type probe for E07-03

<400> SEQUENCE: 3
aggcatactc attgtca                                                     17

<210> SEQ ID NO 4
<211> LENGTH: 17
<212> TYPE: DNA
<213> ORGANISM: Artificial Sequence
<220> FEATURE:
<223> OTHER INFORMATION: mutant type probe for E07-03

<400> SEQUENCE: 4
aggcatactg attgtca                                                     17

<210> SEQ ID NO 5
<211> LENGTH: 17
<212> TYPE: DNA
<213> ORGANISM: Artificial Sequence
<220> FEATURE:
<223> OTHER INFORMATION: wild type probe for E08-01

<400> SEQUENCE: 5
tctccaaagc ggccacg                                                     17

<210> SEQ ID NO 6
<211> LENGTH: 17
<212> TYPE: DNA
<213> ORGANISM: Artificial Sequence
<220> FEATURE:
<223> OTHER INFORMATION: mutant type probe for E08-01

<400> SEQUENCE: 6
tctccaaagt ggccacg                                                     17

<210> SEQ ID NO 7
<211> LENGTH: 323
<212> TYPE: DNA
<213> ORGANISM: Artificial Sequence
<220> FEATURE:
<223> OTHER INFORMATION: target polynucleotide E04-05

<400> SEQUENCE: 7
ccgggatgaa gagatgagag cactgaggtt gggggggtcaa ctggatagcc agggccctag      60
ttctgtccta agaggaggaa gttgtgtctt ctccatccaa ccatccaaag ccctccccag     120
atttagccgg cagtgcgtgg tggacaaaga caagaggaac cagtgccgct actgcaggct     180
caagaaatgc ttccgggctg gcatgaagaa ggaaggtgag cctcggccct ccccgcccca     240
ccaccactgc cccacctgca cccacagctc cccgacagtc atttacaact gtagccacac     300
```

-continued

```
tttatgactc agtggcaggc ccc                                         323

<210> SEQ ID NO 8
<211> LENGTH: 335
<212> TYPE: DNA
<213> ORGANISM: Artificial Sequence
<220> FEATURE:
<223> OTHER INFORMATION: target polynucleotide E07-03

<400> SEQUENCE: 8
gacaccccca cccctactc catccctgtt ctccctcctc acctctctgt gcctcctcac    60
agccgtccag aatgagcggg accggatcag cactcgaagg tcaagctatg aggacagcag   120
cctgccctcc atcaatgcgc tcctgcaggc ggaggtcctg tcccgacagg taccggggtg   180
atcctgccac ccacccaggg atcccccaca ctacagagga gctcacctcc tccacctcca   240
ttctccccag ccaggccctg gagcagctga cgggaggggc ctcagatatt acagaaggga   300
cactgagtgc ggtttcacat ggcccagttt gcagc                             335

<210> SEQ ID NO 9
<211> LENGTH: 459
<212> TYPE: DNA
<213> ORGANISM: Artificial Sequence
<220> FEATURE:
<223> OTHER INFORMATION: target polynucleotide E08-01

<400> SEQUENCE: 9
ccctgcaggt cctcctccca caggcaccag ctatcttgcc aacttaaaag ccaaaactag    60
aggagagggg tcaacccaag gtgacttccc atcctccctc cctcccaacc cttccaggca   120
atgactacat tgtccctcgg cactgcccgg agctggcgga gatgagccgg gtgtccatac   180
gcatccttga cgagctggtg ctgcccttcc aggagctgca gatcgatgac aatgagtatg   240
cctacctcaa agccatcatc ttctttgacc caggtacagt gcacacctcc taagccatcc   300
ctgactctct ctccagaacg ctctgccaga cttctcctat tgggttctgt acactgagtt   360
cacagcctca tctcatgtta acgacagcca ggagaggccg ttttcattta acagatgagg   420
caagtcaaga tttgaagaga caatatggcc gggcgcagt                         459
```